M. L. Roberts.
Knitting Mach.

Reissued Dec. 22, 1868

No. 3242.

Witnesses:
M. J. Morrison
James McCallum

Inventor:
Marly L. Roberts

United States Patent Office.

MARK L. ROBERTS, OF MOUNT UNION, OHIO.

*Letters Patent No.* 31,404, *dated February* 12, 1861; *reissue No.* 3,242, *dated December* 22, 1868.

IMPROVEMENT IN KNITTING-MACHINE.

The Schedule referred to in these Letters Patent and making part of the same.

*To all whom it may concern:*

Be it known that I, MARK L. ROBERTS, of Mount Union, in the county of Stark, and State of Ohio, have invented a new and useful Improvement in Knitting-Machines; and I do hereby declare that the following is a full, clear, and exact description of the construction and operation of the same, reference being had to the annexed drawings, making a part of this specification, in which—

Figure 1:
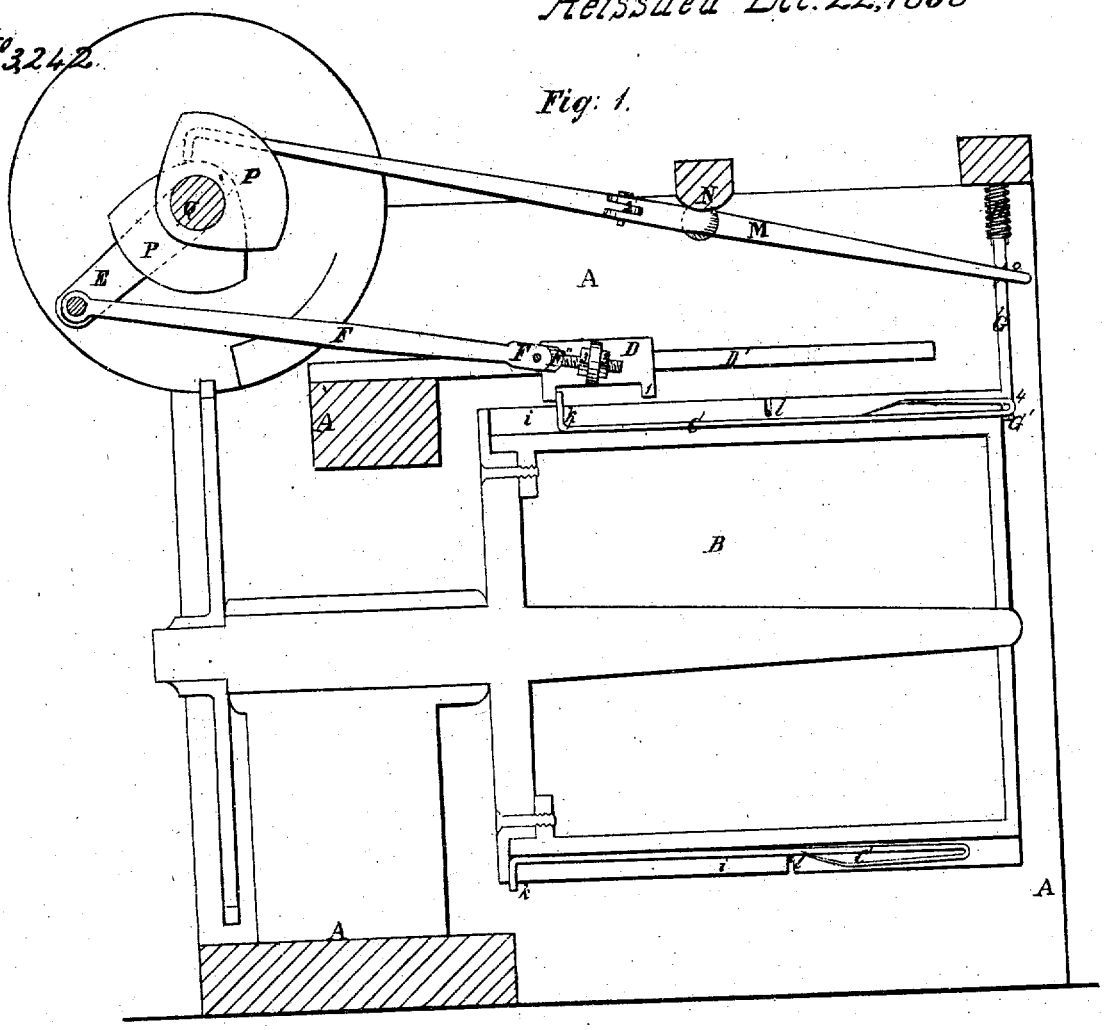
Figure 2:
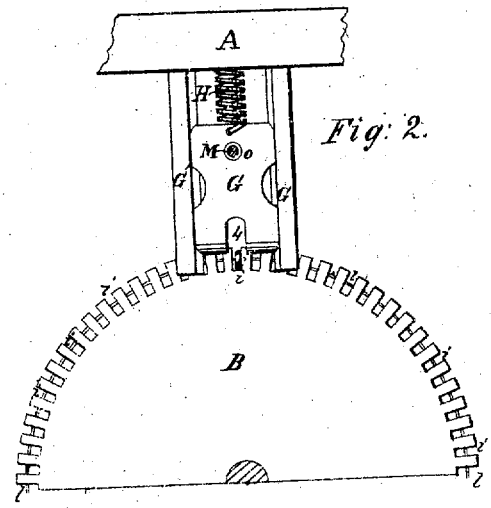

Figure 1 is a vertical longitudinal section of part of the machine, having the improvement applied, and Figure 2, a sectional front view of part of the same.

Like letters, when in the different figures, indicate the same objects.

My invention consists in the combination of the vertically-sliding presser, and the cylindrical needle-carrier, so arranged that the presser works in contact with the front face of the cylindrical carrier.

Also, in the combination of the spring-looped needles, provided with the right-angular supporting and carrying-shank, with the reciprocating carrier and the sliding presser, and cylindrical needle-carrier, above described.

In the drawings—

A is the frame of the machine;
B, the needle-carrier;
C C, the needles;
D, the needle-operator;
E, the crank;
F, the connecting-rod;
G, the presser; and
G′ G′, its stationary guides.

The needle-carrier B has a deep, straight, rectangular, independent groove, *i*, for each one of the numerous needles *c*, the said grooves being cut parallel with each other along the periphery of the carrier, as seen in fig. 1, and at equal distances apart, as seen in fig. 2, the said grooves, and their distances apart, being represented in the drawings as of the regular working-size.

The needles C C, two only being shown, are, in this instance, made with a spring-closing eye or loop, as in Hollen's patent, but instead of extending the stem back and then forward, so as to form an upper stem to work in the notches of a steadying-wheel for support, as heretofore, they are made single at their rear ends, as seen in fig. 1, the said end being simply bent, as seen at *k*, which produces not only the stud, whereby the operator D slides the needle forward and back, but serves, in combination with the sides of the groove *i*, as a perfectly-sufficient means for supporting the needle in proper position in the said groove.

A wire tie, *l*, is let into the carrier, transversely, as seen in the drawings, merely for the purpose of keeping the needles from falling out from the under side, and not to bind them in the grooves *i i*. The said needles can therefore be inserted or withdrawn, as occasion may require, with the greatest facility.

The operator D is simply a block of metal, grooved so as to fit around and slide upon a stationary guide, D′, and be attached to the connecting-rod F, which is jointed at F′ to a screw-stem, F″, which is adjustably fixed to the said operator D, by means of jam-nuts, 2 2, in the well-known manner seen in fig. 1.

The under side of the operator D has two broad projections, 1 1, which reach down nearly to the periphery of the needle-carrier B, and alternately catch upon the studs *k* of the needles, in operating them.

The presser G is a flat plate, constructed so as to be capable of being slid up and down between the vertical stationary guides G′ G′, (which are fixed to the frame A,) in close contact with the face-end of the needle-carrier B, its lower end being bevelled, so as to produce a chisel-edge next to the face of the carrier, and also slotted in its middle, as seen at 4, so that it may pass clear of the needle, as it slides up and down in the guides G′ G′. The thin bevelled edge may also be slightly serrated, to prevent the possibility of the stitches or fabric slipping from under it, as it is pressed down upon the same.

Its vertical-sliding motion is effected by means of the bent lever M, which has its fulcrum at N, whilst its weight-end passes loosely through a double-countersunk hole, *o*, in the presser G, as seen in the drawings, and its power-end rests upon either of the two cams P P, on the crank-shaft Q, it being jointed at 2, so that it may be moved from one cam to the other, as may be required in knitting to the right and left.

The presser G is suspended between the guides G′ G′, by means of a spring, H, which draws it up as the weight-end of the lever rises, so as to bring its bevelled edge above the needle. The cams P P acting on the lever M, force it downward, to produce the requisite pressure on the stitches.

By this arrangement the stitches are pressed down more certainly, and thus the liability of their being slipped out of the eyes of the needles is averted.

Having thus fully described my improvement, and pointed out its utility,

What I claim as new therein, and desire to secure by Letters Patent, is—

1. The vertically-sliding presser G and cylindrical needle-carrier B, when combined and arranged so that the presser works in contact with the front face of the cylindrical carrier, substantially as and for the purpose described.

2. In combination with the above, and the reciprocating carrier D, the spring-looped needles C, when provided with the right-angled supporting and carrying-shank *k*, substantially as and for the purpose described.

MARK L. ROBERTS.

Witnesses:
WM. A. MORGAN,
G. C. COTTON.